Patented Mar. 16, 1943

2,313,945

UNITED STATES PATENT OFFICE 2,313,945

AGE RESISTOR FOR RUBBER COMPOSITIONS

Henry B. Kellog, Union City, and Irving E. Lightbown, Elizabeth, N. J., assignors, by mesne assignments, to Jasco, Incorporated, a corporation of Louisiana No Drawing. Application May 4, 1939, Serial No. 271,710

4 Claims. (Cl. 260—93)

This invention relates to the preparation of rubber or rubber-like compositions which resist deterioration due to aging or to exposure to the atmosphere and sunlight.

Rubber ages or oxidizes fairly rapidly to a hard brittle, inelastic material. Such an oxidation with the attendant deterioration of the rubber is of course undesirable because it reduces the active life of the rubber article. For instance, a rubber tire after aging for about one year without being used, will thereafter run only half the distance a new tire would have run. To offset this deterioration numerous age resistors or anti-oxidants have been proposed, among these being secondary aromatic amines, diaryl amines or condensation products of amines with ketones. Many of these age resistors, have a darkening effect on white rubber materials which deepens with aging and when exposed to sunlight. Also in many cases these compounds discolor lacquers when the rubber or the rubber-like material in which they are incorporated is placed against a lacquered surface.

An object of this invention is to improve the age resistance and flex cracking of rubber in its various forms and rubber-like materials and compositions thereof, for which purpose we have found the class of organic isothiocyanates to be particularly advantageous. Another object is to prepare a light colored or white rubber composition resistant to aging and flex cracking. Other objects and details of the invention will be apparent from the following description.

The present invention concerns the use in oxidizable organic compositions of organic isothiocyanates of the general formula $$R-(NCS)_n$$

in which R represents an alkyl, aryl, alicyclic, alkylated cyclic or a polar substituted member of any of these groups having at least 6 carbon atoms, and $n$ is an integer of 1 or 2. The alkyl and aromatic isothiocyanates have been found to be useful as antioxidants for oxidizable organic substances and particularly as flex-improvers or anti-flex-cracking agents when incorporated in rubber or rubber-like materials which undergo repeated strains during use, such as tire treads, etc. The isothiocyanates preferred for use in this invention include hexyl isothiocyanate, ethyl hexyl isothiocyanate, iso-heptyl isothiocyanate, phenyl isothiocyanate, alpha naphthyl isothiocyanate, beta naphthyl isothiocyanate, benzyl isothiocyanate, p-oxyphenyl isothiocyanate, meta and para phenylene-di-isothiocyanate, toluyl-isothiocyanate, meta-toluylene-di-isothiocyanate, xylylene-di-isothiocyanate, 2,4-diaminodiphenyl isothiocyanate, 4-isopropoxydiphenyl isothiocyanate, o-amino diphenyl isothiocyanate, p-amino diphenyl isothiocyanate, phenyl-beta-naphthyl isothiocyanate, p-ethoxyphenyl-beta-naphthyl isothiocyanate, di-p-tolylisothiocyanate; and the isomers of these compounds.

Any one or a mixture of several of the above enumerated substances or of other equivalent substances falling within the same class may be incorporated into rubber and rubber-like material with good effect on its age-resisting properties. For example, from 0.5% to 5% of such an anti-oxidant may be mixed with rubber before vulcanization, the anti-oxidant having substantially no accelerating effect and therefore ordinarily not necessitating an adjustment of vulcanizing conditions. Alternately the anti-oxidant may be applied to the surface of crude rubber, vulcanized rubber or vulcanizable synthetic rubber-like materials. Rubber so treated resists the deteriorating influence of aging and exposure to the atmosphere and sunlight far better than similar untreated rubber. Moreover, in those cases in which it is desired to avoid undue discoloration it is preferred to rely entirely on the new anti-oxidants of the class herein described.

To illustrate as a specific example one embodiment of the invention a rubber composition was made according to the following formula:

| | Parts |
|---|---|
| Smoked sheets | 100.0 |
| Zinc oxide | 5.0 |
| Sulfur | 2.5 |
| Stearic acid | 2.0 |
| "Captax" (mercapto-benzathiazole) | 1.0 |

This was divided into portions to one of which was added 2 parts (1.8% of the weight of the composition) of alpha naphthyl isothiocyanate. The compositions were then separately mixed on a regular two roll laboratory rubber mill until they were soft and plastic, and then vulcanized in a mold at 145° C. for 15 minutes. The 15-minute period produced an overcure of the stocks. That is to say, they had passed their maximum cure as manifested by the relatively low tensile strength. It is on an overcured stock, however, that the effect of age resistors is most noticeable.

The relative rates of aging of the vulcanized compositions were compared by measuring their respective tensile strength before and after aging. Accelerated aging tests were carried out in the Geer aging oven, in which samples were maintained at a temperature of 70° C., in a constantly renewed stream of air, as well as in the Bierer-Davis bomb, in which other samples were maintained at the same temperature (70° C.) in an atmosphere of oxygen at a pressure of 300 lbs. per square inch.

The respective compositions containing the anti-oxidants, after accelerated aging were subjected to tensile strength determinations, and the results obtained are tabulated in the following table which illustrates the effectiveness of the presence of a small amount of anti-oxidant in the rubber compositions:

|  | Blank | 2% anti-oxidant |
|---|---|---|
| Before aging_____lb./sq. in__ | 1,975 | 1,650 |
| After 48 hrs. in bomb_____do___ | 420 | 1,270 |
| After 7 days in oven_____do___ | 170 | 1,460 |
| Loss in tensile (bomb)_____percent__ | 79 | 23 |
| Loss in tensile (oven)_____do___ | 92 | 12 |

The above tests were made in the same oven and bomb upon corresponding samples taken from the respective composition as described above and the results obtained are comparable to show the difference in age-resistance.

The difference in the above two stocks after aging is very evident. Whereas the blank loses 80–90% of its tensile strength after aging, the same stock containing 2% of the anti-oxidant according to the invention loses only 12–23%. Furthermore, the tendency of the treated stocks to crack when subjected to rapidly repeated flexing in a De Mattia type machine is almost entirely eliminated. At the end of a run of 1,600,000 flexures the blank stocks were cracked almost all the way through, whereas the stock containing the anti-oxidant showed only slight cracking.

The anti-oxidants of the present invention are valuable because of the fact that in contrast to many of the commercial anti-oxidants they do not noticeably stain the treated rubber or rubber-like stock either when the stocks are exposed to direct sunlight or ordinary diffused light, whereas prior anti-oxidants have the very serious fault of producing a highly objectionable discoloration of the treated rubber stocks under the influence of light.

In a test, samples of both the treated and untreated stocks were exposed to a carbon arc for 16 hours. At the end of that time the blank showed almost no staining and the stock containing the anti-oxidant was only slightly discolored. In another test, a stock containing 2% of the anti-oxidant was compared to a stock containing 2% of a commercial age resistor "Agerite powder" (phenyl beta naphthyl amine). At the end of 16 hours exposure to a carbon arc lamp the stock containing 2% of alpha naphthyl isothiocyanate was lighter in color as compared to the stock containing the commercial age resistor, which was stained a very dark brown.

In evaluating the age resisting properties of these aromatic isothiocyanates, a comparison was made with one commercial anti-oxidant, to wit, phenyl beta naphthylamine.

A rubber stock of the following composition was made:

| | Parts |
|---|---|
| Smoked sheets | 100.0 |
| Zinc oxide | 50.0 |
| Sulfur | 3.0 |
| Stearic acid | 1.0 |
| Captax (mercapto benzothiazole) | 1.5 |
| Titanium dioxide | 15.0 |
| Whiting | 30.0 |
| Paraffin | 1.0 |

This compounded batch was divided into three portions, one of which was used as a blank.

To the second portion of the stock 1% alpha naphthyl isothiocyanate was added. To the third portion 1% of phenyl beta naphthyl amine was added. These compositions were then separately mixed on a regular laboratory rubber mill until they were soft and plastic, and then vulcanized in a mold at 145° C. for 15 minutes. Tensile strengths before and after aging for 96 hours in a Bierer-Davis bomb were determined and the test results are shown in the following table which illustrates the comparative superiority of alpha naphthyl isothiocyanate over phenyl beta naphthyl amine.

*Optimum tensile strength*

| Material | Before aging | After aging | Loss in tensile after aging 96 hrs. in Bierer-Davis bomb | Staining |
|---|---|---|---|---|
| | Lb./sq. in. | Lb./sq. in. | Per cent | |
| Blank | 3,050 | 2,420 | 20.5 | None. |
| Blank+alpha naphthyl isothiocyanate | 2,575 | 2,240 | 13.0 | Slight. |
| Blank+phenyl beta naphthylamine | 2,680 | 2,180 | 18.6 | Very dark. |

White side wall tires, for instance, are made with very little (e. g. 0.25%) of an age resistor because of the fact that many age resistors heretofore available (when present in quantities large enough to give adequate age deterioration protection e. g. 1–2%) have caused white rubber to become discolored to a dark brown or even black shade when the tire is exposed to sunlight, as under running conditions. In addition, the heretofore available age resistors when present in rubber will stain white or light colored enamel or lacquer when the rubber and the enameled or lacquered surfaces are juxtaposed. Instances of such uses are refrigerator door stripping, washing machine gaskets, automobile windshield and door stripping as well as various automobile parts and accessories in which no age resistor has hitherto been acceptable because of the staining, bleeding or discoloring by the age resistor in the rubber of the white enamel of the refrigerator or the lacquered surface of the automobile, etc. The age resistors according to this invention, however, may be employed for such purposes because of the relative slight or negligible discoloring effect they impart.

The anti-oxidants of this invention, in addition present a broadly new combination of features since they serve not only as age resistors to improve the age-resistance of the treated stocks, but simultaneously they also show the unexpected characteristics of providing a very valuable increase in the flex-cracking resistance of the stocks to which they are added, and this combination of characteristics appears to be a feature of these organic isothiocyanates.

Although the organic isothiocyanates of this invention are useful in white or light colored rubber because of their ability to retard age deterioration, without danger of undue discoloration, they may be obviously used also to retard the age deterioration of dark colored rubber compositions, or of compositions consisting of or containing unvulcanized rubber, and rubber-like materials, such as gutta percha, balata, artificial rubber polymers and copolymers, synthetic rubber or synthetic rubber-like materials such as polymers of butadiene, chloroprene, co-polymers of diolefines and unsaturated nitriles, in which the diolefines are present in more than 50% of the mixture and which are co-polymerized either dry at 30° C.–100° F., or in emulsion at 50° C.–60° C. Likewise copolymers obtainable from other polymerizable compounds, such as diolefines and styrol, vinyl naphthalene, etc. Copolymers which are obtained by reacting a low molecular weight olefine, preferably an iso-olefine, such as isobutylene, with low molecular weight diolefine, preferably a conjugated diolefine, such as butadiene, at relatively low temperatures, namely below 0° C. and preferably below −50° C. to −80° C. and even as low as −103° C. in the presence of a suitable metallic halide catalyst such as $AlCl_3$ dissolved in methyl or ethyl chloride may also be stabilized against age deterioration and flex-cracking whether or not the same have been admixed with fillers, pigments, curing agents and the like.

It will be observed that all of these rubberlike materials as above listed are characterized by a high elasticity, indicated by a high percentage of extensibility under load and forcible retraction to approximately original size and shape when the load is removed; and in addition, a good tensile strength, good flexure and abrasion resistances, and reactivity with sulfur.

The organic isothiocyanates of this invention may likewise be employed not only by mechanical incorporation into the rubber, but by application to its surface by means of a solution either by spraying or painting or by mixing with liquid dispersions of rubber such as latex and rubber cements, and may be employed either alone or together with other anti-oxidants, accelerators, solvents, pigments and the like.

They may likewise be incorporated into paint and varnish compositions, enamels, printing inks, etc., as anti-skinning and weather resisting agents, by adding a suitable proportion, say from 0.01% to 5% of one or a mixture of these antioxidants.

This invention is not limited to the specific embodiments shown herein, as it is possible to produce still other embodiments without departing from the inventive concepts herein disclosed and it is therefore desired to claim all novelty disclosed herein.

We claim:

1. A new composition of matter comprising in combination a rubbery substance characterized by a high elongation under load, a forcible retraction to approximately original size upon removal of load, and reactivity with sulfur, together with sulfur, a vulcanization accelerator and alpha naphthyl isothiocyanate.

2. A new composition of matter comprising in combination natural rubber together with sulfur, a vulcanization accelerator and alpha naphthyl isothiocyanate.

3. A new composition of matter comprising in combination a rubbery diolefinic polymer characterized by a high elongation under load, a forcible retraction to approximately original size upon removal of load, and reactivity with sulfur, together with sulfur, a vulcanization accelerator and alpha naphthyl isothiocyanate.

4. A new composition of matter comprising in combination a rubbery substance characterized by a high elongation under load, a forcible retraction to approximately original size upon removal of load, and reactivity with sulfur, together with sulfur, a vulcanization accelerator and alpha naphthyl isothiocyanate, the said rubbery substance comprising a low temperature polymer of isobutylene with a diolefin.

HENRY B. KELLOG.
IRVING E. LIGHTBOWN.